April 6, 1965  W. L. FRY  3,176,842
INSPECTING HOLLOW CONTAINERS FOR LINE-OVER-FINISH DEFECTS
Filed Oct. 19, 1960
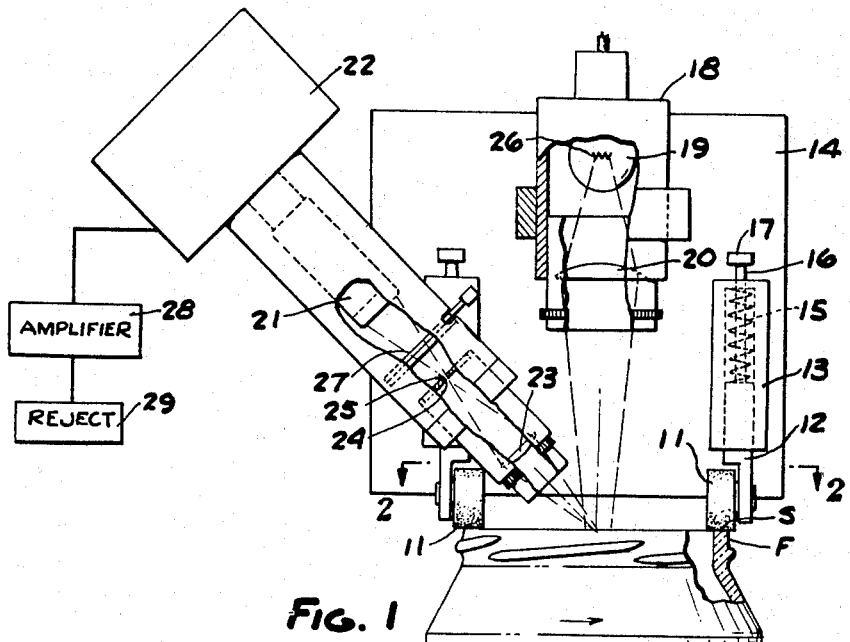
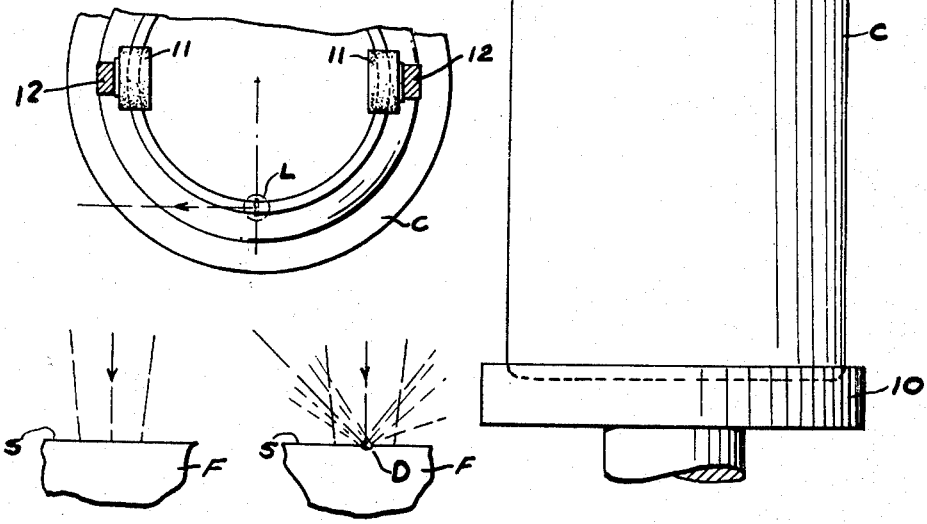
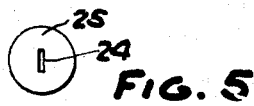
INVENTORS
WILLIAM L. FRY &
ALBERT F. UHLIG
BY
J. RALPH HOGE and
W. A. SCHAICH
ATTORNEYS 3,176,842
INSPECTING HOLLOW CONTAINERS FOR
LINE-OVER-FINISH DEFECTS
William L. Fry, Lafayette, and Albert F. Uhlig, Oakland, Calif., assignors to Owens-Illinois Glass Company, a corporation of Ohio
Filed Oct. 19, 1960, Ser. No. 63,550
15 Claims. (Cl. 209—111.7)

This invention relates to inspecting hollow containers made of translucent material and, particularly, glass containers for line-over-finish defects in the top surface of the rim or finish thereof.

In the manufacture of hollow containers of transparent material such as glass from a gob of glass, it is common to find small blisters in the glass. Such blisters are often elongated due to the blowing of the glass. When such elongated blisters are present in the rim or finish of the hollow container, they may interfere with the sealing of a closure having sealing material or a gasket therein with the rim. Because of this, it is essential to detect the presence of such defects in the rim of the hollow container.

It is an object of this invention to provide a method and apparatus for detecting the presence of line-over-finish defects in the rim of the container and particularly in the top surface of the rim of the container.

It is a further object of the invention to provide such a method and apparatus which permits the detection to be accomplished simply and at minimum expense.

Basically, the invention comprises directing a beam of radiant energy onto the surface which is to be inspected in a direction normal to the surface and rotating the article relative to the beam to cause the beam to scan the surface. The beam is preferably focused in a spot onto the surface. When a defect is encountered, the defect will cause the beam to be randomly reflected away from the surface. A light-sensitive device is positioned adjacent the surface with its line of vision forming an acute angle and intersecting the beam at the surface of the container. Means are provided for focusing the randomly reflected portion of the beam into an image adjacent the light-sensitive device. When such an image is presented adjacent the light-sensitive device, the device is energized creating an electrical signal which may be amplified and caused to energize a reject mechanism.

In the drawings:

FIG. 1 is a partly diagrammatic, part sectional elevation of an apparatus embodying the invention.

FIG. 2 is a fragmentary sectional view taken along the line 2—2 in FIG. 1, parts being removed.

FIGS. 3 and 4 are partly diagrammatic views showing the action of the beam of radiant energy on the top surface of the container being inspected.

FIG. 5 is a plan view of an aperture plate used in the apparatus.

Referring to FIG. 1, the apparatus embodying the invention comprises a pad 10 onto which the container C, made of translucent material such as glass and having an upper rim or finish F, is positioned. The pad 10 is adapted to be elevated to bring the top surface S of the finish F into contact with diametrically opposed rollers 11. Rollers 11 preferably are made of an anti-friction material such as nylon. Each roller 11 is mounted for rotation on a vertical plunger 12 about a naxis which is at a right angle to the axis of the container C. Each plunger 12 is reciprocably mounted in a housing 13 on head 14. A coil spring 15 yieldingly urges each plunger 12 downwardly. A rod 16 on each plunger 12 extends upwardly through the end of the housing 13 and is enlarged as at 17 to form a stop limiting the downward movement of the plunger 12. The pad 10 is adapted to be rotated and, in turn, rotate the container C about its axis. As the container C is rotated, the rollers 11 apply a yielding force to spaced points on the periphery of the top surface S holding the container C firmly on the pad 10.

A light source 18 is mounted on the head 14 and comprises a housing enclosing an incandescent bulb 19 and an adjustable lens 20 for directing a beam of light downwardly and focusing it into a spot L on the top surface S of the rim of the container. As shown in FIG. 3, the light normally passes into the material of the container C or is reflected upwardly toward the light source 18. If, however, a defect D, such as shown in FIG. 4, is encountered, that is, such as is formed by an elongated blister, a portion of the beam is randomly reflected away from the top surface S.

A light-sensitive device 21, such as a photocell, is mounted in a housing 22 on the head 14 with its line of vision forming an acute angle, preferably 45 degrees, with the direction of the beam and intersecting the beam at the surface of the container. The randomly reflected portion of the beam is collected by a collecting lens 23 and focused in an image at aperture 24 of aperture plate 25. The incandescent bulb 19 includes an elongated filament 26 and the bulb is so oriented that the spot of light on the top surface S has its longest dimension extending radially. The aperture plate 25 is so oriented that the aperture 24 is in alignment with the area onto which the spot is directed. Polaroid filters 27 are provided between the light-sensitive device 21 and the container C for adjusting the intensity of the light which is reflected to the sensitivity of the device 21.

If an image is created at the aperture 24, the light-sensitive device 21 is caused to produce a signal which, in turn, is amplified by an amplifier 28 that energizes a reject mechanism 29. If desired, a time delay may be interposed between the amplifier and the reject mechanism so that the container is rejected after it has been removed from the pad 10 and at another point in its travel.

It can thus be seen that there has been provided a method and apparatus for quickly and easily detecting the presence of line-over-finish defects in the top surface of a hollow container such as a glass jar. Satisfactory results can be achieved without precise alignment of the line of vision of the light-sensitive device with the area of the surface being inspected.

We claim:

1. The method of inspecting hollow containers made of translucent material for the presence of line-over-finish defects on the rim thereof of the type formed by blisters in the material which comprises directing a beam of radiant energy onto the surface of the rim of the container being inspected in a direction normal to the surface, focusing said beam of radiant energy into a spot on the surface of the rim of the container being inspected, moving the container relative to the beam about the axis of the container to cause the spot to scan the surface of the rim of the container, thereby causing a defect to randomly reflect a portion of the beam away from the surface, positioning a device sensitive to the radiant energy of the beam with its line of vision in the path of the reflected portion of the beam and intersecting the area of the rim onto which the spot is directed, and rejecting the container when a defect causes a portion of the beam to be directed to said sensitive device.

2. The method of inspecting hollow containers made of translucent material for the presence of line-over-finish defects on the rim thereof of the type formed by blisters in the material which comprises directing a beam of radiant energy onto the surface of the rim of the container being inspected in a direction normal to the surface, focusing a beam of radiant energy into a spot on the surface of the rim of the container being inspected, causing relative movement between the beam and the container about the axis of the container to cause the spot to scan the surface of the rim of the container, thereby causing a defect to randomly reflect a portion of the beam away from the surface, positioning a device sensitive to the radiant energy of the beam with its line of vision forming an angle of approximately 45° with the direction of the beam toward the container and intersecting the area of the rim onto which the spot is directed, and rejecting the container when a defect causes a portion of the beam to be directed to said sensitive device.

3. The method of inspecting hollow containers made of translucent material for the presence of line-over-finish defects on the rim thereof of the type formed by blisters in the material which comprises directing a beam of radiant energy on the top surface of the container in a direction normal to said surface, focusing said beam into a spot on the top surface, rotating said container about its axis thereby causing the spot to scan the top surface of the rim of the container, thereby causing a defect to randomly reflect a portion of the beam upwardly and laterally away from the top surface of the rim of the container, creating an electrical signal in response to said randomly reflected portion of the beam, and rejecting the container when an electrical signal is created.

4. The method of inspecting hollow containers made of translucent material for the presence of line-over-finish defects on the rim thereof of the type formed by blisters in the material which comprises directing a beam of radiant energy on the top surface of the container in a direction normal to said surface, focusing said beam into a spot on the top surface, rotating said container about its axis thereby causing the spot to scan the top surface of the rim of the container, thereby causing a defect to randomly reflect a portion of the beam upwardly and laterally away from the top surface of the rim of the container, positioning a device sensitive to the radiant energy of the beam with its line of vision forming an angle with the beam and intersecting said beam at the area of the rim being inspected, creating an electrical signal in response to said randomly reflected portion of the beam striking said device, and rejecting the container when an electrical signal is created.

5. The method of inspecting hollow containers made of translucent material for the presence of line-over-finish defects on the rim thereof of the type formed by blisters in the material which comprises directing a beam of radiant energy to which the material of the container is transparent onto the surface of the rim of the container being inspected in a direction normal to the surface, focusing said beam of radiant energy into a spot on the surface of the rim of the container being inspected, moving the container relative to the beam about the axis of the container to cause the spot to scan the surface of the rim of the container, causing a defect to randomly reflect a portion of the beam away from the surface, positioning a device sensitive to the radiant energy of the beam wtih its line of vision in the path of the reflected portion of the beam and intersecting the area of the rim onto which the spot is directed, and rejecting the container when a defect causes a portion of the beam to be directed to said sensitive device.

6. The method of inspecting hollow containers made of translucent material for the presence of line-over-finish defects on the rim thereof of the type formed by blisters in the material which comprises directing a beam of radiant energy to which the material of said container is transparent on the top surface of the container in a direction normal to said surface, focusing said beam into a spot on the top surface, rotating said container about its axis thereby causing the spot to scan the top surface of the rim of the container, and causing a defect to randomly reflect a portion of the beam upwardly and laterally away from the top surface of the rim of the container, positioning a device sensitive to the radiant energy of the beam with its line of vision forming an angle with the beam and intersecting said beam at the area of the rim being inspected, creating an electrical signal in response to said randomly reflected portion of the beam, and rejecting the container when an electrical signal is created.

7. The method of inspecting hollow containers made of translucent material for the presence of line-over-finish defects on the rim thereof which comprises positioning said container on a pad, rotating the pad to thereby cause the container to rotate about its axis, continuously applying a yielding force to spaced points on the periphery of the top surface of the rim of the container, directing a beam of radiant energy vertically downwardly onto the top surface of the rim of the container, thereby causing said beam to scan the surface of the container during said rotation, and causing a defect to randomly reflect the portion of the beam upwardly and laterally away from the top surface of the container, creating a signal in response to said randomly reflected portion of the beam, and rejecting the container when a signal is created.

8. The method of inspecting hollow containers made of translucent material for the presence of line-over-finish defects on the rim thereof of the type formed by blisters in the material which comprises directing a beam of radiant energy onto the surface of the rim of the container being inspected in a direction normal to the surface, focusing a beam of radiant energy into a spot on the surface of the rim of the container being inspected, moving the container relative to the beam about the axis of the container to cause the spot to scan the surface of the rim of the container, thereby causing a defect to randomly reflect a portion of the beam away from the surface, positioning a device sensitive to the radiant energy of the beam with its line of vision in the path of the randomly reflected portion of the beam and intersecting the area of the rim onto which the spot is directed, focusing said randomly reflected portion of the beam into an image of the defect adjacent to the sensitive device, and rejecting the container when a defect causes a portion of the beam to be directed to said sensitive device.

9. The method of inspecting hollow containers made of translucent material for the presence of line-over-finish defects on the rim thereof of the type formed by blisters in the material which comprises directing a beam of radiant energy on the top surface of the container, focusing said beam into a spot on the top surface in a direction normal to the surface, rotating said container about its axis thereby causing the spot to scan the top surface of the rim of the container, and causing a defect to randomly reflect a portion of the beam upwardly and laterally away from the top surface of the rim of the container, positioning a device sensitive to the radiant energy of the beam with its line of vision forming an angle of approximately 45 degrees with the beam and intersecting said beam at the area of the rim being inspected, focusing said randomly reflected portion of the beam into an image of the defect adjacent to the sensitive device, causing said randomly reflected portion of the beam to create an electrical signal, and rejecting the container when an electrical signal is created.

10. In an apparatus for inspecting the rim of a hollow container made of translucent material for line-over-finish defects of the type formed by blisters in the material, the combination which comprises means for supporting the container in inspecting position, means for directing a beam of radiant energy onto the surface of the rim of the container which is to be inspected in a direction normal to the surface, a light-sensitive device, means for supporting said light-sensitive device with its line of vision forming an acute angle with the direction of the beam toward the top surface of the rim of the container and intersecting the beam at the top surface of the container such that the beam is not normally reflected toward the light sensitive device, means energized by said light-sensitive device for rejecting the container when a portion of the beam is randomly dispersed away from the surface into the line of vision of the light-sensitive device by a defect in the surface of the rim of the container, means for focusing the randomly dispersed portion of the beam in an image adjacent said light-sensitive device.

11. In an apparatus for inspecting the rim of a hollow container made of translucent material for line-over-finish defects, the combination which comprises a pad on which said container is supported, means for rotating said pad to rotate the container about its axis, a plurality of rollers mounted for rotation about axes at right angles to the axis of the container, means for yieldingly urging each said roller downwardly onto the top surface of the container thereby holding said container firmly against said pad, means for directing a light beam vertically downwardly onto the top surface of the container, means for focusing said beam in a spot on the top surface of the container, a light-sensitive device, means for supporting said light-sensitive device in position adjacent the top of the container with its line of vision forming an acute angle with the direction of the light beam toward the container and intersecting the beam at the top surface of the container, whereby a defect causes a portion of the beam to be randomly reflected toward said light-sensitive device, and means for focusing said randomly reflected portion in an image of the defect adjacent the light-sensitive device.

12. In an apparatus for inspecting the rim of a hollow container made of translucent material for line-over-finish defects of the type formed by blisters in the material, the combination which comprises a pad on which said container is supported, means for rotating said pad to rotate the container about its axis, means for directing a light beam vertically downwardly onto the top surface of the container, means for focusing said beam in a spot on the top surface of the container, a light-sensitive device, means for supporting said light-sensitive device in position adjacent the top of said container with its line of vision forming an acute angle with the direction of the light beam toward the container and intersecting the beam at the top surface of the container such that the beam is not normally reflected toward the light sensitive device, whereby a defect causes a portion of the beam to be randomly reflected toward said light-sensitive device, and means for focusing said randomly reflected portion in an image of the defect adjacent the light-sensitive device.

13. In an apparatus for inspecting the rim of a hollow container made of translucent material for defects, the combination which comprises a pad on which said container is supported, means for rotating said pad to rotate the container about its axis, a plurality of rollers mounted for rotation about axes at right angles to the axis of the container, means for yieldingly urging each said roller downwardly onto the top surface of the container thereby holding said container firmly against said pad, said means including a plunger on which each said roller is mounted, a housing in which said plunger is reciprocably mounted, and spring means yieldingly urging said plunger downwardly.

14. The method of inspecting hollow containers made of translucent material for the presence of line-over-finish defects on the top surface of the rim thereof of the type formed by blisters in the material which comprises directing a beam of radiant energy on the top surface of the rim of the container in a direction normal to said surface, focusing said beam into a spot on the top surface, rotating said container about its axis relative to said spot to thereby cause the spot to scan the top surface of the rim of the container so that a line-over-finish defect randomly reflects a portion of the beam away from the top surface and laterally with respect to the beam, poistioning a device sensitive to the radiant energy of the beam with its line of vision forming an angle of approximately 45° with the beam and intersecting the spot at the area of the rim being inspected, focusing said randomly reflected portion of the beam into an image of the defect adjacent said sensitive device, restricting the field of vision of said device so that only the randomly reflected portion of the beam will pass to the device, and creating a signal in response to the energization of said device.

15. In an apparatus for inspecting the rim of a hollow container made of translucent material for line-over-finish defects of the type formed by blisters in the material, the combination which comprises means for supporting the container in inspecting postion, means for directing a beam of radiant energy onto the top surface of the rim of the container in a direction normal to the surface, means for focusing said beam in a spot on said top surface, a light sensitive device, means for supporting said light sensitive device in position closely adjacent the top surface of the container with its line of vision forming an angle of approximately 45° with the direction of the light beam toward the container and intersecting the beam at the top surface of the container, whereby a line-over-finish defects causes a portion of the beam to be randomly reflected toward said light sensitive device, a mask positioned adjacent said device and restricting the field of vision of said device to said randomly reflected portion, and means interposed between said mask and said container for focusing said randomly reflected portion in an image of the defect on said mask adjacent the light sensitive device.

References Cited by the Examiner

UNITED STATES PATENTS

| | | |
|---|---|---|
| 2,327,629 | 8/43 | Fedorchak. |
| 2,481,863 | 9/49 | Owens _____ 209—111 X |
| 2,643,767 | 6/53 | Baker _____ 209—111 |
| 2,682,802 | 7/54 | Fedorchak et al. |
| 2,753,459 | 7/56 | Fedorchak. |
| 2,806,401 | 9/57 | Demuth et al. |
| 2,902,151 | 9/59 | Miles _____ 209—111 |

FOREIGN PATENTS 1,214,338  11/59  France.

SAMUEL F. COLEMAN, *Acting Primary Examiner.*
ROBERT C. RIORDON, CLAUDE A. LE ROY, ERNEST R. FALLER, JR., *Examiners.*